(12) United States Patent
Hütte

(10) Patent No.: US 6,329,452 B1
(45) Date of Patent: Dec. 11, 2001

(54) POLYURETHANES AND ELASTANE FIBRES FINISHED TO RENDER THEM ANTISTATIC

(75) Inventor: Stephan Hütte, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/245,492

(22) Filed: Feb. 5, 1999

(30) Foreign Application Priority Data

Feb. 9, 1998 (DE) ............................................. 198 05 130

(51) Int. Cl.$^7$ ................. C08J 5/10; C08K 5/41; C08L 75/04
(52) U.S. Cl. .............. 524/173; 524/157; 524/166; 524/305
(58) Field of Search .................... 524/157, 166, 524/173, 305

(56) References Cited

U.S. PATENT DOCUMENTS

| | | | |
|---|---|---|---|
| 3,296,063 | 1/1967 | Chandler | 161/175 |
| 4,296,174 | 10/1981 | Hanzel et al. | 428/389 |
| 4,844,824 | * 7/1989 | Mermelstein et al. | 252/8.75 |
| 4,895,902 | 1/1990 | Lodoen et al. | 525/128 |
| 5,135,575 | 8/1992 | Yang et al. | 106/287 |

FOREIGN PATENT DOCUMENTS

| | | | |
|---|---|---|---|
| 1174739 | 7/1964 | (DE) . | |
| 3736749 | 5/1989 | (DE) | C08L/69/00 |
| 3925078 | 2/1990 | (DE) | C08L/75/04 |
| 0079443 | 5/1983 | (EP) | D06M/13/224 |
| 0377434 | 7/1990 | (EP) | D06P/1/54 |
| 0493766 | 7/1992 | (EP) | D01F/9/22 |
| 2283200 | 3/1976 | (FR) | C09K/3/16 |

OTHER PUBLICATIONS

Chemical Abstracts, vol. 120, (1994) Ref. 219625n.
Chemical Abstracts, vol. 121, (1994) Ref. 282260a.
Chemical Abstracts, vol. 122, (1995) Ref. 135965b.
Chemical Abstracts, vol. 126, (1997) Ref. 278909e.
C.R. Caryl et al. "Esters of Sodium Sulfosuccinic Acid" Industrial and Engineering Chemistry, published by the American Chemical Society vol. 31 (Jan. 1939) pp. 44–47 plus title p.
Derwent abstract of JP 09049167–A (May 17, 1996).
H. Gall et al. "Polyurethan–Elstomerfasern" Kunstoff-–Handbuch 7, (1993) pp. 679–694.

* cited by examiner

Primary Examiner—James J. Seidleck
Assistant Examiner—U.K Rajguru

(57) ABSTRACT

This invention relates to polyurethane compositions, and relates in particular to elastic polyurethane fibres resulting therefrom, which contain a dialkyl sulphosuccinate as an additive and/or which are finished with a polydialkylsiloxane, with a dialkyl sulphosuccinate and optionally with a mineral oil. As a result of this addition or of the preparation of the polyurethane composition or of the elastic polyurethane fibres with dialkyl sulphosuccinate, electrostatic charging of the polymer, such as that which occurs during the processing of warp-knitted fabric made of polyurethane fibres for example, is suppressed.

8 Claims, No Drawings

POLYURETHANES AND ELASTANE FIBRES FINISHED TO RENDER THEM ANTISTATIC

This invention relates to polyurethane compositions, and relates in particular to elastic polyurethane fibres resulting therefrom, which contain a dialkyl sulphosuccinate as an additive and/or which are finished with a mixture comprising a polydialkylsiloxane, a dialkyl sulphosuccinate and optionally a mineral oil. As a result of this addition or of the preparation of the polyurethane composition or of the elastic polyurethane fibres with dialkyl sulphosuccinate, electrostatic charging of the polymer, such as that which occurs during the processing of warp-knitted fabric made of polyurethane fibres for example, is suppressed. In extreme cases, electrostatic charging can result in sparks flying due to electrical discharges.

The expression "fibre" which is used in the context of the description of the present invention includes staple fibres and continuous filaments which can be produced by spinning processes, the principles of which are known, such as the dry spinning process, the wet spinning process or the melt spinning process.

These spinning processes are described, for example, in Polyurethan-Elastomerfasern, by H. Gall and M. Kausch, in the Kunststoff-Handbuch 7, Polyurethanes, Editor: G. Oertel, Carl Hanser Verlag, Munich, Vienna, 1993, pages 679 to 694.

Elastic polyurethane fibres comprising long chain synthetic polymers, at least 85% of which are synthesised from segmented polyurethanes based on polyethers, polyesters and/or polycarbonates for example, are well known. Yarns made of fibres such as these are used for the production of sheet goods or woven textiles or substances which in turn are suitable for foundation garments, hosiery and sports clothing, such as swimwear or bathing trunks for example. The warp-knitting process is one form of processing polyurethane fibres to form sheet goods. A high rate of processing in the warp-knitting process can result in the twisting of the warp fibres, due to which the processing procedure is significantly impaired. This can ultimately result in the stoppage of machinery.

One cause of problems during the processing of warp-knitted fabrics is the electrostatic charging of the fibre material. In some cases, this can even result in sparks flying due to intense electric discharge phenomena. From a practical point of view, these problems during the processing of warp-knitted fabrics are unacceptable, since they necessitate an unwanted reduction in processing speed or a costly installation of spray bars on the processing machines in order to dissipate the electrical charge.

One solution to the problem of electrostatic charging during the processing of polyurethane fibres is described in Japanese Patent Application JP 9-49 167. This patent discloses finishing compositions (preparations) which contain a mixture of salts of alkanol-ammonium- and alkali metal-phosphoric acid esters as additives which are necessary for imparting antistatic properties to the fibres. The disadvantage of the mixture of salts of phosphoric acid esters which is described in this document is the limited solubility of these salts in the preparation oil, which consists of a mixture of polydimethylsiloxanes and mineral oils. Due to this, a special and technically expensive preparation technique is necessary for the deposition of the preparation on the polyurethane fibres, so as to be able to ensure uniform deposition of the preparation. Another disadvantage of this known preparation is the content of salts of phosphoric acid esters in the preparation, which can restrict the mode of operation of biologically operating sewage treatment plants when introduced into the production waste water. Due to this, large amounts of salt-containing waste material, which has to be disposed of separately, are formed during the further processing of polyurethane fibres in washing and dyeing processes, for example.

U.S. Pat. No. 32,96,063 describes the use of a preparation for the protection of polyurethane fibres from electrostatic charging, which consists of a mixture of low-viscosity polydimethylsiloxanes or mineral oils and polyamylsiloxane. However, the preparation system described has the disadvantage that the protection from electrostatic charging is not satisfactory.

U.S. Pat. Nos. 42,96,174 and 51,35,575 describe mixtures of polydimethylsiloxane, polyamylsiloxane and salts of fatty acids for the preparation of polyurethane fibres. However, the preparation systems described also have the disadvantage that the protection from electrostatic charging is not satisfactory.

A preparation system consisting of an aminopolysiloxane and a dialkyl sulpho-succinate is known from EP 493 766 A1. This water-soluble mixture is claimed to protect acrylic fibres from charging during the further processing thereof to form carbon fibres, and is completely decomposed on the oxidation and graphitisation of the acrylic fibres to form carbon fibres. However, the preparation system described has the disadvantage that the amino groups of the aminopolysiloxane can react with the polyurethane composition. This can result in the swelling of elastane fibres, for example, which has a disadvantageous effect on the processing properties of the fibres. Moreover, the removal of the preparation by washing which is necessary before the dyeing of an elastane fibre is made more difficult or is impossible. Uniform dyeing of the fibres is thereby made difficult or is even prevented. One serious disadvantage of the preparation system described is that aminopolysiloxanes can be toxic on inhalation. Accordingly, both the preparation of the fibres and further processing have to be carried out in particularly costly closed installations. For the further processing to form carbon fibres which is described in EP 493 766, this disadvantage is accepted for the production of the intermediate product.

The underlying object of the present invention is to provide a polyurethane fibre, the antistatic properties of which are improved compared with known polyurethane fibres. Improving the antistatic properties should result, during the processing of warp-knitted fabrics which are used for the production of foundation garments or swimwear, in the processing procedure not being impaired due to electrostatic charging.

This object is achieved according to the invention by adding an effective amount of a dialkyl sulphosuccinate, as a substance having an antistatic effect, to the polyurethane composition, and/or by depositing this substance in a suitable form as an external preparation on the elastic fibres.

The present invention relates to a polyurethane composition which exhibits improved antistatic behaviour, characterised in that it comprises A) from 99.98 to 65% by weight, particularly 99.95 to 80% by weight, most preferably 99.9 to 85% by weight, of a polyurethane B) from 0.02 to 15% by weight, particularly 0.05 to 5% by weight, most preferably 0.1 to 3% by weight, of a dialkyl sulphosuccinate corresponding to general formula (1)

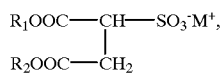

wherein
  $R_1$ and $R_2$, independently of each other and identically or differently, represent hydrogen or an alkyl group comprising 1 to 30 carbon atoms, and preferably represent an alkyl group comprising 4 to 18 carbon atoms, and
  $M^+$ is $H^+$, $Li^+$, $Na^+$, $K^+$ or $NH_4^+$, and
  C) from 0 to 20% by weight, particularly 0 to 15% by weight, of additive substances.

Due to the improvement in the electrostatic behaviour of the polyurethane fibres, an improvement can be achieved in the processing of the fibres by, for example, the warp-knitted fabric procedure.

The present invention further relates to polyurethane fibres which are finished to render them antistatic, and which are based on a thermoplastic polyurethane or on a polymer comprising at least 85% by weight of segmented polyurethane containing from 0.02 to 15% by weight, particularly 0.05 to 5% by weight, most preferably 0.1 to 3% by weight of a dialkyl sulphosuccinate corresponding to general formula (1)

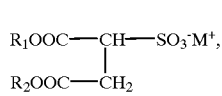

wherein
  $R_1$ and $R_2$, independently of each other and identically or differently, represent hydrogen or an alkyl group comprising 1 to 30 carbon atoms, and preferably represent an alkyl group comprising 4 to 18 carbon atoms, and
  $M^+$ is $H^+$, $Li^+$, $Na^+$, $K^+$ or $NH_4^+$,
wherein in particular the dialkyl sulphosuccinate is finely dispersed in the fibre and/or and is distributed on the fibre surface.

Dialkyl sulphosuccinates can be prepared as described in the literature by C. R. Carly, Ind. Eng. Chem., Vol. 31, page 45, 1939.

The dialkyl sulphosuccinates which are particularly preferred are sodium diisobutyl-sulphosuccinate, sodium dioctylsulphosuccinate, sodium dihexylsulphosuccinate, sodium diamylsulphosuccinate and sodium dicyclohexylsulphosuccinate.

The dialkyl sulphosuccinates which are more particularly preferred are sodium dioctylsulphosuccinate and sodium dihexylsulphosuccinate.

The dialkyl sulphosuccinate which is most particularly preferred is sodium dioctylsulphosuccinate.

The dialkyl sulphosuccinates which are used for improving the electrostatic properties can be used as individual substances or as mixtures of a plurality of dialkyl sulphosuccinates.

The dialkyl sulphosuccinate can be added to the polyurethane composition, e.g. during the production of polyurethane fibres, at any point in the processing of the composition. For example, the dialkyl sulphosuccinates can be added in the form of a solution or slurry to a solution or dispersion of other polyurethane or PU fibre additives. During a processing operation to form fibres, they can then be mixed with the polymer solution or injected into the latter upstream of the fibre spinnerets. The dialkyl sulphosuccinates can also of course be added separately to the polymer (spinning) solution, as a wax or as a solution or slurry in a suitable medium. Moreover, the dialkyl sulphosuccinates can be added in the form of the aforementioned formulations during the customary production of polyurethane.

The dialkyl sulphosuccinates can also be deposited as finishing agents during the production of polyurethane fibres. For example, the dialkyl sulphosuccinates can be incorporated, as a wax-like raw material or in the form of a slurry or solution in a suitable solvent, in the low-viscosity polydialkylsiloxanes or mineral oils which are known in principle for the finishing of polyurethane fibres.

Due to the good solubility of the dialkyl sulphosuccinates in polydialkylsiloxanes and mineral oils, homogeneous solutions can be formed which can be deposited on the polyurethane fibres by the usual preparation technique, such as via preparation rollers or fibre guides or by spraying.

A mineral oil can optionally be added in order to improve the solubility of the dialkyl sulphosuccinates in polydialkylsiloxanes. Mixtures such as these are preferably used.

Therefore, the present invention also relates to an antistatic composition containing at least
  D) from 0.02 to 15% by weight, particularly 0.05 to 5% by weight, most preferably 0.1 to 3% by weight, of a dialkyl sulphosuccinate corresponding to general formula (1)

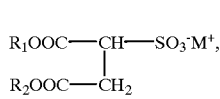

wherein
  $R_1$ and $R_2$, independently of each other and identically or differently, represent hydrogen or an alkyl group comprising 1 to 30 carbon atoms, and preferably represent an alkyl group comprising 4 to 18 carbon atoms, and
  $M^+$ is $H^+$, $Li^+$, $Na^+$, $K^+$ or $NH4^+$, and
  E) from 85 to 99.98% by weight, particularly 95 to 99.95% by weight, most preferably 97 to 99.9% by weight, of a polyalkysiloxane and/or alkoxylated polyalkylsiloxane, particularly a polydimethylsiloxane and/or an ethoxylated polydimethylsiloxane with a viscosity of 2 to 100 mPa.s (at 25° C.), particularly 2.5 to 50 mPa.s (at 25° C.), most preferably 2.5 to 30 mPa.s (at 25° C.),
  or a mineral oil with a viscosity of 2 to 2500 mPa.s (at 25° C.),
  particularly of 2.5 to 2000 mPa.s (at 25° C.), most preferably 3 to 1500 mPa.s (at 25° C.),
  or an arbitrary mixture of the mineral oil and polyalkylsiloxane cited under E).

In addition, dialkyl sulphosuccinates can also be added in the form of preparations which are customary for the finishing of polyurethane fibres and which apart from polydialkylsiloxanes and mineral oils contain other adjuvant substances, for example metal salts of fatty acids, e.g. Mg, Ca, Zn or Al salts of stearic acid, oleic acid or palmitic acid, modified polyorganosiloxanes, e.g. branched or crosslinked polyorganosiloxanes, esters of fatty acids or other emulsifiers. The preparations may also exist in the form of dispersions, e.g. in combination with salts of fatty acids. Due to the good solubility of the dialkyl sulphosuccinates in polydialkylsiloxanes, optionally with the addition of mineral oils here, the deposition of these preparations is not altered when improving the electrostatic properties of polyurethane fibres, and can be effected by means of the existing preparation technique.

The polyurethane compositions according to the invention, or polyurethane fibres which can be produced therefrom, may contain, as additive substances C) for various purposes, substances such as matting agents, fillers, antioxidants, colorants, pigments, mordants, and stabilisers against the effects of heat, light, UV radiation and steam. In particular, these additive substances are added in metered amounts so that they do not have an effect which acts in opposition to the dialkyl sulphosuccinate which is incorporated as an internal additive or which is deposited externally with the preparation.

Examples of antioxidants and stabilisers against the effects of heat, light or UV radiation include stabilisers from the group comprising sterically hindered phenols, HALS stabilisers (hindered amine light stabilisers), triazines, benzophenones and benzotriazoles. Examples of pigments and matting agents include titanium dioxide, zinc oxide and barium sulphate. Examples of colorants include acidic dyes, dispersion and pigment dyes and optical brighteners.

Said additives are employed in metered amounts so that that they do not have an effect which acts in opposition to the dialkyl sulphosuccinate which is incorporated as an internal additive or which is deposited externally with the preparation.

In addition to being processed to form fibres, the polyurethanes which are finished with dialkyl sulphosuccinate to render them antistatic can also be used for the production of mouldings, films, elastomers, foaming agents, etc.

The present invention further relates to a method of producing polyurethane fibres, which are finished to render them antistatic, by the melt spinning, dry spinning or wet spinning process, particularly by the dry spinning or wet spinning process, which is characterised in that from 0.02 to 15% by weight, particularly 0.05 to 5% by weight, most preferably 0.1 to 3% by weight of a dialkyl sulphosuccinate corresponding to general formula (1)

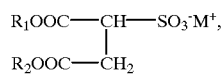

(1)

wherein
$R_1$ and $R_2$, independently of each other and identically or differently, represent hydrogen or an alkyl group comprising 1 to 30 carbon atoms, and preferably represent an alkyl group comprising 4 to 18 carbon atoms, and
$M^+$ is $H^+$, $Li^+$, $Na^+$, $K^+$ or $NH_4^+$, is admixed with the polyurethane melt or polyurethane solution, particularly the polyurethane solution, before spinning the melt or solution to form polyurethane fibres.

If less than 0.02% by weight of the dialkyl sulphosuccinate is distributed within the filament or on the filament surface, the reduction in electrostatic charging is not always satisfactory. The incorporation of more than 15% by weight of dialkyl sulphosuccinate inside the filament can result in disadvantageous physical properties of the fibres and is therefore not recommended.

Apart from the incorporation of dialkyl sulphosuccinates in the polyurethane fibres by introducing them into the polyurethane composition, the dialkyl sulphosuccinates can also be deposited externally, in combination with the preparation for example, in order to improve the electrostatic behaviour of the polyurethane fibres.

One independent variant of the method of producing polyurethane fibres, which are finished to render them antistatic, by the melt spinning, dry spinning or wet spinning processes, particularly by the dry spinning or wet spinning process, is characterised in that a preparation oil containing from 0.02 to 15% by weight, particularly 0.05 to 5% by weight, most preferably 0.1 to 3% by weight of a dialkyl sulphosuccinate corresponding to general formula (1)

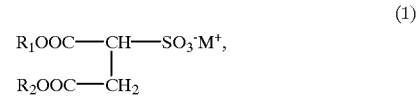

(1)

wherein
$R_1$ and $R_2$, independently of each other and identically or differently, represent hydrogen or an alkyl group comprising 1 to 30 carbon atoms, and preferably represent an alkyl group comprising 4 to 18 carbon atoms, and
$M^+$ is $H^+$, $Li^+$, $Na^+$, $K^+$ or $NH_4^+$,
is applied as an external coating to the spun, solidified polyurethane fibres at a preparation location.

The antistatic composition according to the invention is prepared, for example by the addition and dissolution of an effective amount of the dialkyl sulphosuccinate, namely an amount of 0.02% by weight to 15% by weight, preferably an amount of 0.05% by weight to 5% by weight, and most preferably an amount of 0.10% by weight to 3% by weight, with respect to the weight of the preparation, to a polyalkylsiloxane, preferably polydimethylsiloxane, with a viscosity of 2 to 100 mPas (25° C.), preferably with a viscosity of 2.5 to 50 mPas (25° C.), and most preferably with a viscosity of 2.5 to 30 mPas (25° C.). In order to improve the solubility of the dialkyl sulphosuccinate in the preparation oil, the polyalkylsiloxanes can be replaced by mineral oil with a viscosity of 2 to 2500 mPas (25° C.), preferably with a viscosity of 2.5 to 2000 mPas (25° C.), and most preferably with a viscosity of 3 to 1500 mPas (25° C.), or mineral oils can be added in an amount of 0.1% by weight to 95% by weight, preferably in an amount of 0.3% by weight to 50% by weight, and most preferably in an amount of 0.5% by weight to less than 25% by weight, with respect to the weight of the preparation. Moreover, the preparation may contain other known additives for the finishing of polyurethane fibres, such as metal salts of fatty acids in amounts less than or equal to 5% by weight, modified polyorganosiloxanes in amounts less than or equal to 15% by weight, and esters of fatty acids in amounts of less than or equal to 30% by weight, with respect to the weight of the preparation. The mineral oil is further characterised by a density of 805 to 910 kg/m³ (15° C.) and a viscosity-density constant (VDC), as determined according to DIN 51 378), of 0.770 to 0.825.

The preparation is deposited in an amount of 1 to 15% by weight, preferably in an amount of 2 to 10% by weight, and most preferably in an amount of 3 to 8% by weight, with respect to the weight of the fibres.

The polyurethane fibres according to the invention consist of segmented polyurethane polymers, for example those which are based on polyethers, polyesters, polyether esters, polycarbonates or mixtures thereof. Fibres of this type can be produced by methods which are known in principle, such as by the methods which are described in patent specifications U.S. Pat. Nos. 2,929,804, 3,097,192, 3,428 711, 3,553, 290 and 3,555,115 and in WO 9309174, for example. Moreover, the polyurethane fibres may consist of thermoplastic polyurethanes, the production of which is described, for example, in U.S. Pat. No. 5,565,270. When their fibres are processed to form foundation garments or swimwear by a warp-knitted fabric procedure, all these polymers can exhibit twisting of the fibre warp due to electrostatic charging if they are not treated with antistatic agents or are treated with conventional antistatic agents. The fibres which are finished to render them antistatic according to the invention therefore comprise all the cited fibres.

The dialkyl sulphosuccinates are additives which can be incorporated in the polyurethane fibres and/or which can be deposited externally with the preparation. Surprisingly, it has been found that dialkyl sulphosuccinates are readily soluble in the oils which are customary for the preparation of polyurethane fibres, such as polydialkylsiloxanes and/or mineral oils, so that a homogeneous solution can be formed. Even when added in small amounts, they result in a significant improvement in the electrostatic properties without further salts, for example alkanol ammonium salts or alkaline earth halides, having to be added. They can be processed with the preparation as an external coating by known preparation techniques, for example by means of preparation rollers, fibre guides or by spraying. Dialkyl sulphosuccinates contain no heavy metals and are harmless from a toxicological and eco-toxicological point of view, and are therefore preferentially suitable. No waste water with a high salt content, which could reduce or even destroy the mode of action of a biologically operating sewage treatment installation, is produced during further processing, e.g. during dyeing.

As shown in the examples given below, a further result of the incorporation and/or deposition of dialkyl sulphosuccinates with the preparation on polyurethane fibres is that the electrostatic properties of the treated polyurethane fibres, for example their volume resistance, are considerably improved. A reduction in volume resistance is achieved irrespective of whether dialkyl sulphosuccinates are incorporated in the polyurethane composition or are deposited externally with a preparation. The measurement of the volume resistance is a measure of the electrostatic behaviour of the polyurethane fibres. By reducing the volume resistance it is possible to improve the electrostatic behaviour of polyurethane fibres. Due to this, the twisting of warp fibres during the processing of warp-knitted fabrics is suppressed. Machine stoppages during the processing of warp-knitted fabrics can be prevented by means of the polyurethane fibres according to the invention, and the rate of the processing operation and the productivity associated therewith can be increased.

In particular, the polyurethanes of the polyurethane composition according to the invention, which also comprise segmented polyurethanes, can be produced from a linear homo- or copolymer comprising a hydroxy group at the end of their molecule in each case and with a molecular weight of 600 to 4000 g/mole, such as polyether diols, polyester diols, polyester amidodiols, polycarbonate diols, polyacrylic diols, polythioester diols, polythioether diols, polyhydrocarbon diols or from a mixture of or from copolymers of this group. Moreover, the polyurethane is based in particular on organic diisocyanates and a chain extension agent comprising a plurality of active hydrogen atoms, such as di- and polyols, di- and polyamines, hydroxylamines, hydrazines, polyhydrazides, polysemicarbazides, water or a mixture of these components. Examples of diols include ethylene glycol, 1,2-propanediol, butanediol or hexanediol. Examples of diamines include ethylenediamine, 1,2-propanediamine, 2-methyl-1,5-diaminopentane, 1,3-diaminocyclohexane, 1-methyl-2,4-diamino-cyclohexane or 1,2-diaminocyclohexane.

The dialkyl sulphosuccinates can be incorporated in the polyurethane compositions according to the invention together with or separately from other frequently used additive substances C), such as UV stabilisers, antioxidants, mordant additives, internal lubricants, colorants, fillers, matting agents, etc. Moreover, dialkyl sulphosuccinates can be deposited externally, e.g. together with a finishing agent, on the polyurethanes.

The polyurethane fibres according to the invention can be used for the production of elastic woven fabrics, knitted fabrics, hosiery and other textile goods, particularly those which are used in the swimwear field.

The use of the preparation according to the invention is not restricted to polyurethane fibres only; the preparation can be used in general for the antistatic coating of polymers.

The antistatic polyurethane compositions according to the invention can be processed to form mouldings, films or strips, and also be processed to form fibres, as described.

The test procedure described below was used for measuring the electrical properties of the polymers.

The change in electrical conductivity of the polyurethane compositions was determined by measuring the volume resistance as described in DIN 54 345.

The invention is further explained below by the examples, which do not however constitute a limitation of the invention.

It follows from the examples given that the volume resistance is considerably reduced by the incorporation of dialkyl sulphosuccinates in polyurethanes or by their deposition on the surface thereof. In this respect, the effectiveness of dialkyl sulphosuccinates is significantly better than that of other substances such as phosphoric acid esters or polyamylsiloxane. It was not possible to carry out comparative examples in order to compare the preparation according to the invention with a preparation agent based on aminopolysiloxanes (EP 493 766 A1), since the test apparatus would have had to be encapsulated at considerable technical cost due to the toxicity of aminopolysiloxanes. Due to the considerable reduction of the electrical volume resistance and the improvement in electrostatic behaviour of the polyurethanes which is achieved therewith, electrostatic charging can be prevented during the processing of warp-knitted fabrics made of elastic polyurethane fibres, for example, and the processing procedure can thereby be improved.

EXAMPLE 1

This example demonstrates the effectiveness of dialkyl sulphosuccinates as an antistatic agent in polyurethane compositions which were produced based on polyether diols. The dialkyl sulphosuccinates which acted as antistatic agents were added to the polyurethane composition as an internal additive here.

The polyurethane composition was produced from a polyether diol consisting of polytetrahydrofuran (PTHF) with an average molecular weight of 2000 g/mole. The molecular weight is given as the number average molecular weight. The diol was capped with methylene-bis(4phenyl-diisocyanate) (MDI) in a molar ratio of 1 to 1.8 and was subsequently subjected to chain extension with a mixture of ethylenediamine (EDA) and diethylamine (DEA) in a ratio by weight of 97:3 in dimethylacetamide. (The ratio of the amount of chain extenders and chain terminators to unreacted isocyanate in the prepolymer was 1.075 in all the examples).

Thereafter, a master batch of additives was admixed with the polymer. This master batch consisted of 62.6% by weight dimethylacetamide (DMAC), 10.3% by weight Cyanox 1790 (1,3,5-tris(4-tert.-butyl-3-hydroxy-2,5-dimethylbenzyl)-1,3,5-triazine -2,4,6-(1H,3H,5H)-trione; a product of American Cyanamid), 27.0% by weight of a 30% spinning solution and 0.001% by weight of the dyestuff Makrolexviolett (a product of Bayer AG). This master batch was added to the polyurethane composition so that the content of Cyanox 1790 was 1.0% by weight with respect to the total solids content.

A second master batch was admixed with this polyurethane composition. This second master batch consisted of 30.9% by weight titanium dioxide Type RKB 2 (a product of Bayer AG), 44.5% by weight DMAC and 24.6% by weight of a 30% spinning solution, such that the resulting titanium dioxide content of the final spinning solution was 0.05% by weight with respect to the polyurethane-urea polymer.

A third master batch was then admixed with this polyurethane composition. This third batch consisted of 5.5% by weight Silwet L 7607 (a polyalkoxy-modified polydimethylsiloxane; viscosity: 50 mPas (at 25° C.), molecular weight 1000 g/mole, a product of OSI Specialties), 5.5% by weight magnesium stearate, 45.0% by weight DMAC and 44.0% by weight of a 30% spinning solution, and was added so that the resulting magnesium stearate content was 0.25% by weight with respect to the polyurethane-urea polymer.

A fourth master batch was admixed with this polyurethane composition. This fourth master batch consisted of 15.0% by weight of the dialkyl sulphosuccinates given in Table 1, 54.0% by weight dimethylacetamide and 31.0% by weight of a 30% spinning solution, so that the resulting dialkyl sulphosuccinate content, with respect to the polyurethane-urea polymer, in the final polyurethane composition was as given in Table 1.

A film was drawn from the polyurethane composition using a doctor blade. The solvent was evaporated in a circulating air drying oven at a temperature of 100° C. for 2 hours. The final film had a layer thickness of 1 mm.

The results of the measurements of the volume resistance are listed in Table 1. It is evident that the volume resistance is significantly reduced, even by the addition of 0.1% by weight of sodium dioctylsulphosuccinate to the polyurethane composition. The effectiveness of this substance as an antistatic agent is thus verified. By adding larger amounts of the antistatic agent to the polyurethane composition the volume resistance was further reduced and the effectiveness of the additive as an antistatic agent was thus increased.

TABLE 1

| Experiment | Dialkyl succinate | Content of dialkyl succinate in film (% by weight) | Volume resistance ($10^9$ ohm) [DC measuring voltage: 100 V] |
| --- | --- | --- | --- |
| 1a | sodium dioctyl sulphosuccinate | 0 | 6.3 |
| 1b | sodium dioctyl sulphosuccinate | 0.1 | 0.45 |
| 1c | sodium dioctyl sulphosuccinate | 0.3 | 0.16 |
| 1d | sodium dioctyl sulphosuccinate | 1 | 0.12 |

EXAMPLE 2

This example shows the effectiveness of dialkyl sulphosuccinates as antistatic agents in polyurethane compositions which are produced based on polyester diols. The dialkyl sulphosuccinates which acted as antistatic agents were added to the polyurethane composition as an internal additive here.

The polyurethane composition was produced from a polyester diol consisting of 30.5% by weight 1,6-hexanediol, 14.5% by weight neopentyl glycol and 55.0% by weight adipic acid with an average molecular weight (number average) of 2000 g/mole. The diol was capped with methylene-bis(4-phenyl diisocyanate) (MDI) in a molar ratio of 1 to 1.85 and was subsequently subjected to chain extension with a mixture of ethylenediamine (EDA) and diethylamine (DEA) (ratio by weight: 98:2) in dimethylacetamide.

The addition of master batches and the production of films were effected in the same manner as described in Example 1 above.

The amounts of dialkyl sulphosuccinate with respect to the polyurethane-urea polymer which were added to the polyurethane composition are given in Table 2. It is evident that the volume resistance of the polyurethane composition is significantly reduced, even by the addition of small amounts of sodium dioctylsulphosuccinate, and the effectiveness of this substance as an antistatic agent is thus verified. Moreover, it was shown in a comparative experiment that the effectiveness of dialkyl sulphosuccinates as antistatic agents is significantly increased compared with that of phosphoric acid esters.

TABLE 2

| Experiment | Dialkyl succinate | Content in film (% by weight) | Volume resistance ($10^9$ ohm) 100 V** |
| --- | --- | --- | --- |
| 2a | sodium dioctyl sulphosuccinate | 0 | 10 |
| 2b | sodium dioctyl sulphosuccinate | 1 | 0.9 |
| 2c (comparison) | phosphoric acid ester* | 1.2 | 5 |

*Preparation DEZ 2; a product of Bayer AG
**DC measuring voltage

EXAMPLE 3

This example shows the effectiveness of dialkyl sulphosuccinates as antistatic agents in polyurethane fibres which were produced based on polyether diols. The dialkyl sulphosuccinates which acted as antistatic agents were deposited on the polyurethane fibres as an additive with the preparation here.

The polyurethane fibres were produced from a polyether diol consisting of polytetrahydrofuran (PTHF) with an average molecular weight (number average) of 2000 g/mole. The diol was capped with methylene-bis(4-phenyl diisocyanate) (MDI) in a molar ratio of 1 to 1.7 and was subsequently subjected to chain extension with a mixture of ethylenediamine (EDA) and diethylamine (DEA) (ratio by weight: 97:3) in dimethylacetamide.

Thereafter, master batches 1 and 2 as described in Example 1 above were admixed with the spinning solution. Dimethylacetamide was used instead of Silwet L 7607 in master batch 3. The master batch prepared in this manner was likewise admixed with the spinning solution.

The final spinning solution was dry-spun through spinnerets, in a spinning apparatus which was typical of those employed for a dry spinning process, to form filaments with a titre of 11 dtex, wherein four individual filaments were combined in each case to form coalescing filament threads. The fibre preparation, which consisted of the preparation oils listed in Table 3, was deposited via a preparation roller, wherein 4% by weight was deposited with respect to the weight of the polyurethane fibre. The polyurethane fibre was subsequently taken up at a rate of 800 m/min.

The amounts of dialkyl sulphosuccinates which were added to the preparation oil for polyurethane fibres based on polyether diols, and the resulting volume resistance of the polyurethane fibres after finishing with various preparation oils, are given in Table 3. It is evident that the volume resistance of polyurethane fibres after a finishing operation with a silicone oil is relatively high, and no antistatic effect is thus associated therewith. This also applies to the preparation oil Silicone Y 7769, which contains a proportion of 10% by weight of polyamylsiloxane. Even the addition of small amounts of dialkyl sulphosuccinates to the preparation oils resulted in each case in a considerable reduction in the volume resistance of the polyurethane fibres. The effectiveness of dialkyl sulphosuccinate as an antistatic agent was thereby verified.

TABLE 3

| Ex-peri-ment | Composition of the preparation/% by weight | | | Volume resistance ($10^{11}$ ohm) | |
|---|---|---|---|---|---|
| | silicone oil % | paraffin | sodium dioctyl sulphosuccinate | 100 V* | 1000 V* |
| 3a | 100** | 0 | 0 | 4 | 4 |
| 3b | 93.5** | 6+ | 0.5 | 1.6 | 1.5 |
| 3c | 92** | 6+ | 2 | 1 | 1.2 |
| 3d | 100++ | 0 | 0 | 3.5 | 3.2 |
| 3e | 89.5++ | 10+ | 0.5 | 3 | 3 |
| 3f | 78++ | 20+ | 2 | 2.5 | 2 |

*DC measuring voltage;
**Silicone Y 7769. A product of OSI Specialties;
+BP Enerpar M 2520. A product of BP Oil;
++Baysilone oil M20. A product of Bayer AG

EXAMPLE 4

This example shows the effectiveness of dialkyl sulphosuccinates as antistatic agents in polyurethane fibres which were produced based on polyester diols. The dialkyl sulphosuccinates which acted as antistatic agents were deposited on the polyurethane fibres as an additive with the preparation here, as in Example 3.

The polyurethane fibres were produced from a polyester diol consisting of 30.5% by weight 1,6-hexanediol, 14.5% by weight neopentyl glycol and 55.0% by weight adipic acid with an average molecular weight (number average) of 2000 g/mole. The diol was capped with methylene-bis(4-phenyl diisocyanate) (MDI) in a molar ratio of 1 to 1.85 and was subsequently subjected to chain extension with a mixture of ethylenediamine (EDA) and diethylamine (DEA) (ratio by weight: 98:2) in dimethylacetamide.

Thereafter, master batches 1 and 2 as described in Example 1 above were admixed with the spinning solution. Dimethylacetamide was used instead of Silwet L 7607 in master batch 3. The master batch prepared in this manner was likewise admixed with the spinning solution.

The final spinning solution was dry-spun by a dry spinning process, as described in Example 3. The polyurethane fibre was subsequently taken up at a rate of 800 m/min.

The amounts of dialkyl sulphosuccinates which were added to the preparation oil for polyurethane fibres based on polyester diols, and the resulting volume resistance of the polyurethane fibres after finishing with various preparation oils, are given in Table 4. It is evident that the volume resistance of polyurethane fibres after a finishing operation with a silicone oil is relatively high, and no antistatic effect is thus associated therewith. This also applies to the preparation oil Silicone Y 7769, which contains a proportion of 10% by weight of polyamylsiloxane. Even the addition of small amounts of dialkyl sulphosuccinates to the preparation oils resulted in each case in a considerable reduction in the volume resistance of the polyurethane fibres. The effectiveness of dialkyl sulphosuccinate as an antistatic agent was thereby verified again.

TABLE 4

| Ex-peri-ment | Composition of the preparation/% by weight | | | Volume resistance ($10^{11}$ ohm) | |
|---|---|---|---|---|---|
| | silicone oil % | paraffin | sodium dioctyl sulphosuccinate | 100 V* | 1000 V* |
| 4a | 100** | 0 | 0 | 9 | 9.5 |
| 4b | 93.5** | 6+ | 0.5 | 5 | 5 |
| 4c | 92** | 6+ | 2 | 4 | 4 |
| 4d | 100++ | 0 | 0 | 3.8 | 3.6 |
| 4e | 89.5++ | 10+ | 0.5 | 2.7 | 2.7 |
| 4f | 78++ | 20+ | 2 | 1.7 | 1.7 |

*DC measuring voltage;
**Silicone Y 7769. A product of OSI Specialties;
+BP Enerpar M 2520. A product of BP Oil;
++Baysilone oil M20. A product of Bayer AG

What is claimed is:
1. A polyurethane composition which exhibits improved antistatic behaviour, comprising
   A) from 99.98 to 65% by weight of a polyurethane
   B) 0.02 to 15% by weight of a dialkyl sulphosuccinate corresponding to general formula (1)

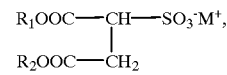

(1)

$$R_1OOC-CH-SO_3^-M^+,$$
$$R_2OOC-CH_2$$

wherein
   $R_1$ and $R_2$, independently of each other and identically or differently, represent hydrogen or an alkyl group comprising 1 to 30 carbon atoms, and
   $M^+$ is a cation selected from the group consisting of $H^+$, $Li^+$, $Na^+$, $K^+$ and $NH_4^+$, and
   C) from 0 to 20% by weight of additive substances.
2. An antistatic composition containing at least
   D) from 0.02 to 15% by weight of a dialkyl sulphosuccinate corresponding to general formula (1)

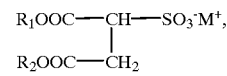

(1)

$$R_1OOC-CH-SO_3^-M^+,$$
$$R_2OOC-CH_2$$

wherein
   $R_1$ and $R_2$, independently of each other and identically or differently, represent hydrogen or an alkyl group comprising 1 to 30 carbon atoms, and
   $M^+$ is a cation selected from the group consisting of $H^+$, $Li^+$, $Na^+$, $K^+$ and $NH_4^+$, and
   E) from 85 to 99.98% by weight of a polyalkylsiloxane or alkoxylated polyalkylsiloxane with a viscosity of 2 to 100 mPa·s at 25° C., or a combination thereof, or a mineral oil with a viscosity of 2 to 2500 mPa·s at 25° C., or a mixture of said mineral oil and said polyalkylsiloxane, polyalkylsiloxane or both.

3. Polyurethane fibers which are finished to render them antistatic, and which are based on a thermoplastic polyurethane or on a polymer comprising at least 85% by weight of segmented polyurethane containing from 0.02 to 15 by weight of a dialkyl sulphosuccinate corresponding to general formula (1)

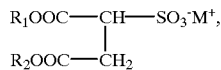

(1)

wherein $R_1$ and $R_2$, independently of each other and identically or differently, represent hydrogen or an alkyl group comprising 1 to 30 carbon atoms, and $M^+$ is a cation selected from the group consisting of $H^+$, $Li^+$, $Na^+$, $K^+$ and $NH_4^+$, which is finely dispersed and is distributed inside the fiber, on the fiber surface or both.

4. A method of producing polyurethane fibers, which are finished to render them antistatic, by the melt spinning process, by producing the spinning melt, spinning the melt, forming threads below a spinneret by cooling the threads, optionally stretching the threads formed, and preparing and taking up the threads, wherein from 0.02 to 15% by weight of a dialkyl sulphosuccinate corresponding to general formula (1)

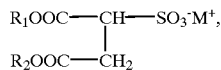

(1)

wherein $R_1$ and $R_2$, independently of each other and identically or differently, represent hydrogen or an alkyl group comprising 1 to 30 carbon atoms, and $M^+$ is a cation selected from the group consisting of $H^+$, $Li^+$, $Na^+$, $K^+$ or $NH_4^+$, is admixed with the polyurethane melt before spinning the melt to form polyurethane fibers.

5. A method of producing polyurethane fibers, which are finished to render them antistatic, by the dry spinning or wet spinning process, by producing the spinning solution, spinning the spinning solution using a spinneret, forming threads below a spinneret by removing the spinning solution by drying or in a precipitation bath, and preparing and taking up the threads, wherein from 0.02 to 15% by weight of a dialkyl sulphosuccinate corresponding to general formula (1)

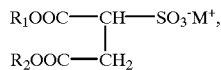

(1)

wherein $R_1$ and $R_2$, independently of each other and identically or differently, represent hydrogen or an alkyl group comprising 1 to 30 carbon atoms, and $M^+$ is a cation selected from the group consisting of $H^+$, $Li^+$, $Na^+$, $K^+$ or $HN_4^+$, is admixed with the polyurethane solution before spinning the solution to form polyurethane fibers.

6. A method of producing polyurethane fibers, which are finished to render them antistatic, by the melt spinning process, by producing the spinning melt, spinning the melt, forming threads below a spinneret by cooling the threads, optionally stretching the threads formed, and preparing and taking up the threads, wherein a preparation oil containing from 0.02 to 15% by weight of a dialkyl sulphosuccinate corresponding to general formula (1)

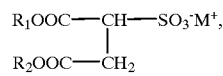

(1)

wherein $R_1$ and $R_2$, independently of each other and identically or differently, represent hydrogen or an alkyl group comprising 1 to 30 carbon atoms, and $M^+$ is a cation selected from the group consisting of $H^+$, $Li^+$, $Na^+$, $K^+$ or $HN^{4+}$, is applied as an external coating to the spun, solidified polyurethane fibers at a preparation location.

7. A method of producing polyurethane fibers, which are finished to render them antistatic, by the dry spinning or wet spinning process, by producing the spinning solution, spinning the spinning solution using a spinneret, forming threads below a spinneret by removing the spinning solution by drying or in a precipitation bath, and preparing and taking up the threads, wherein a preparation oil containing from 0.02 to 15% by weight, of a dialkyl sulphosuccinate corresponding to general formula (1)

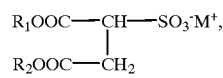

(1)

wherein $R_1$ and $R_2$, independently of each other and identically or differently, represent hydrogen or an alkyl group comprising 1 to 30 carbon atoms, and $M^+$ is a cation selected from the group consisting of $H^+$, $Li^+$, $Na^+$, $K^+$ or $HN_4^+$, is applied as an external coating to the spun, solidified polyurethane fibers at a preparation location.

8. The method according to claim 6, wherein the preparation oil comprising the dialkyl sulphosuccinate further comprises from 85 to 99.88% by weight of a polyalkylsiloxane or alkoxylated ployalkylsiloxane with a viscosity of 2 to 100 mPa.s at 25 C. or a combination thereof, or a mineral oil with a viscosity of 2 to 2500 mPa.s at 25 C., or a mixture of said mineral oil and said polyalkylsiloxane, polyalkylsiloxane or both.

* * * * *